DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 14, 1970

873 O.G. 340

T873,009

METHOD OF COATING ON HYDROPHOBIC MATERIALS

Robert Benton Campbell, Kodak Park Division, Rochester, N.Y. 14650, and Charles Harold Gaffin II, 222 Escuela St., Apt. 23, Mountain View, Calif. 94040

Filed Nov. 7, 1969, Ser. No. 874,982

Int. Cl. G03c *1/80, 1/86*

U.S. Cl. 96—85

No Drawing. 6 Pages Specification

An improved method is provided for adhering a hydrophilic layer to a hydrophobic support or layer in the production of a multilayer or coated element. Accordingly, the hydrophilic coating or layer contains colloidal silica, generally in the ratio of binder solids to silica solids of 1:50 to 1:3 and preferably 1:20 to 1:10. The hydrophilic layer containing colloidal silica is applied to any hydrophobic surface and is preferably a polymeric support such as a polyolefin support which includes, for example, paper coated with polyethylene or polymerized olefin mixtures. Preferably, the hydrophilic coating or layer is an aqueous dispersion such as a hydrophilic colloidal including gelatin and the like, water-soluble polymers, etc. The improved method of this invention provides highly increased adhesion to the hydrophobic support or underlayer without the necessity of pretreatment thereof, such as by flame treatment, electron bombardment and chemical treatments. This process is especially useful in the production of photographic elements wherein a coating of the above silica-containing layer and an overcoated silver halide layer can be carried out simultaneously on a hydrophobic support surface.